Feb. 3, 1959     G. OBERMANN     2,872,404
BUS BAR ARRANGEMENT FOR LARGE ELECTROLYTIC CELLS
Filed May 31, 1956
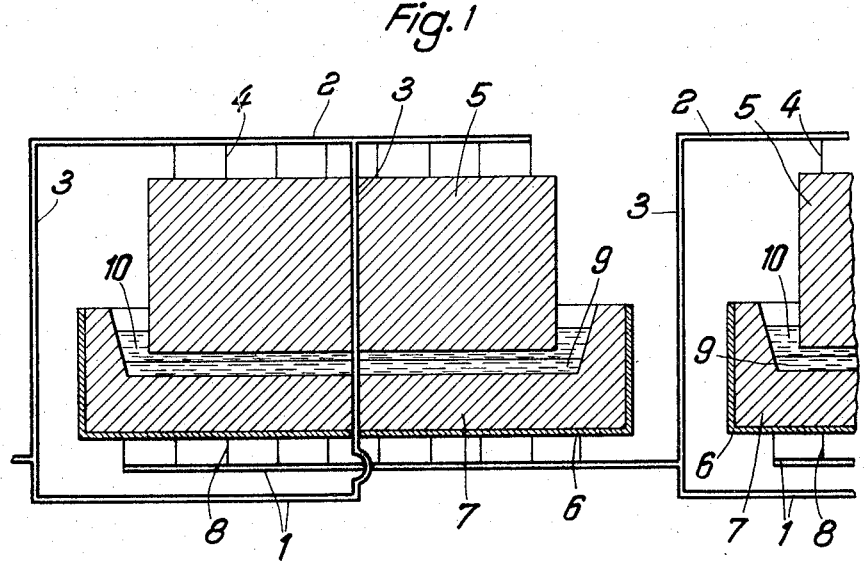
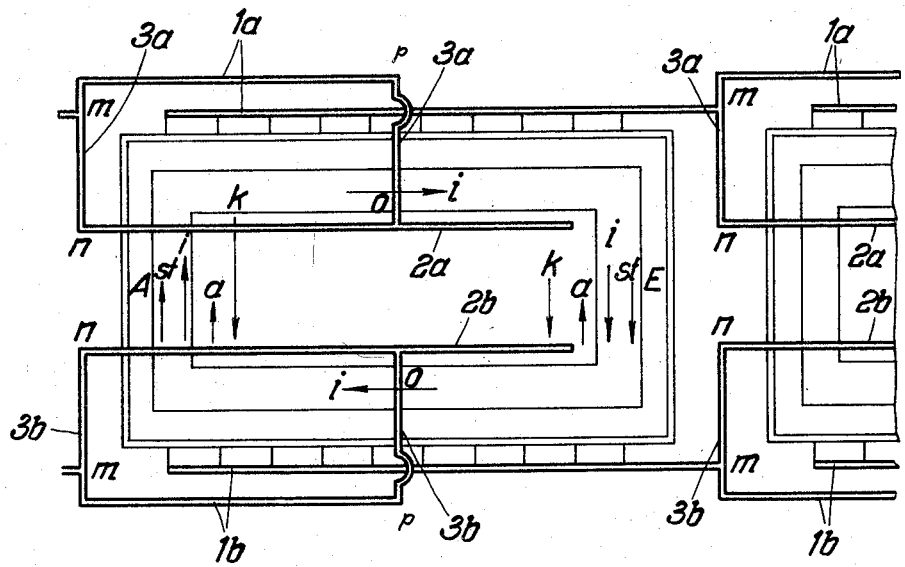
Inventor:
Günter Oberman
By: Michael S. Struker
agt.

2,872,404
Patented Feb. 3, 1959

2,872,404

BUS BAR ARRANGEMENT FOR LARGE ELECTROLYTIC CELLS

Günter Obermann, Grevenbroich (Lower Rhine), Germany, assignor to Vereinigte Aluminium-Werke Aktiengesellschaft, Bonn, Germany Application May 31, 1956, Serial No. 588,462

Claims priority, application Germany June 3, 1955

15 Claims. (Cl. 204—244)

The present invention relates to a bus bar arrangement for large electrolytic cells and more particularly to a bus bar arrangement for large electrolytic cells for the production of metal, for instance aluminum.

The operation of such electrolytic cells is rendered rather difficult because the heavy currents used in these cells produce electromagnetic forces which distort the level of the liquid metal formed in the cells. The heavy current passes through the liquid content of the cells, which comprises a layer of liquid metal, for instance aluminum superimposed by the molten bath of the electrolyte and this liquid cell content is subjected to the influence of the magnetic fields produced in the bus bars of the cells.

Various arrangements have already been suggested to reduce the influence of these electromagnetic forces created in the bus bars on the liquid content of the cells. For instance, it has been suggested to shield the liquid content of the cells from the influence of the electromagnetic fields produced in the bus bar by large iron plates, which arrangement is not only expensive, but requires also considerable space. Another suggestion made is to arrange the anode bus bars and the risers connecting the anode bus bars with the cathode bus bars at relatively large distances from the liquid metal forming in the cells, which arrangement requires also considerable space and considerable material for the necessary bus bar connections, resulting in a considerable energy loss in these extended connections.

It is one object of the present invention to avoid the disadvantages of bus bar arrangements according to the prior art.

It is a further object of the present invention to provide for a bus bar arrangement in which heavy currents flowing therethrough will not distort the liquid level of the metal forming in the electrolytic cell.

It is another object of the present invention to provide for a bus bar arrangement which requires a minimum amount of material commensurate with the heavy currents used and in which energy losses due to extended bus bar connections are avoided.

With these objects in view, the present invention comprises in combination in an electrolytic arrangement a pair of electrolytic cell units each having an anode and a cathode, a cathode bus bar portion electrically connected to the cathode of one unit, and an anode bus bar portion electrically connected to the anode of the other unit. The arrangement comprises further a pair of riser bus bar portions electrically connecting the cathode bus bar portions of one unit to the anode bus bar portions of the other unit and one of these riser portions being located between the units whereas the other of the riser portions being located intermediate the ends of the other of these units.

Preferably, the cathode bus bars and anode bus bars as well as the risers are arranged symmetrically with respect to a longitudinal plane of symmetry of the electrolytic cells, and preferably the riser portions are made to carry equal amperage.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a schematic sectional view of a bus bar arrangement according to the present invention; and Fig. 2 is a top view of the arrangement shown in Fig. 1.

The drawings illustrate schematically electrolytic cells as used for instance in the production of aluminum. Each of the cells comprises a cathode 7 arranged in iron container 6 and an anode means 5 spaced from the cathode means 7 and suspended by well known means not shown in the drawings above the cathode 7. The liquid aluminum 9 covered by the electrolyte 10 forms against the cathode means 7 and constitutes a liquid cathode. If heavy currents are used each of the cells is provided with a pair of cathode bus bars 1a and 1b and a pair of anode bus bars 2a and 2b, which are respectively arranged in parallel. The cathode bus bars 1a, 1b are connected respectively to the cathode 7 by conductors 8 and the anode bus bars are respectively connected to the anode 5 by conductors 4. The cells are connected in series and the cathode bus bars 1a, 1b of one cell are respectively connected to the anode bus bars 2a and 2b of the other cell by risers 3a and 3b.

The electromagnetic fields acting on the liquid metal produced in the electrolytic cells are illustrated in the various top views shown in the drawings by vectors indicating the direction and the order of magnitude of these magnetic fields.

The electromagnetic fields acting upon the liquid metal produced in the cells are the annular interior field produced by the current flowing from the anode 5 to the cathode 7 and indicated in the drawings by the vectors $i$, the fields created by the current flowing through the risers 3a and 3b are indicated in the drawings by the vectors $st$, and the latter fields increase the interior field $i$. In determining the total field acting on the liquid metal produced in the cells the fields produced by the current flowing through the anode bus bars as illustrated by the vectors $a$ and the fields produced by the current flowing through the cathode bus bars illustrated by the vector $k$ have also to be considered. In the following the field $k$ shall be considered as the field produced by all conductors located below the level of the electrolyte.

The present invention overcomes the disadvantages of the bus bar arrangements according to the prior art by reducing the detrimental effect of the electromagnetic fields using at the same time a very economical bus bar arrangement.

Figs. 1 and 2 show by way of an example a bus bar arrangement according to the present invention. According to the invention each of the anode bus bars 2a and 2b is supplied with current at two points $n$ and $o$ by the risers 3 connected to these points. These risers 3 rise from the cathode bus bar of the preceding cell at the points $n$ between two successive cells and the riser connections to the points $o$ rise respectively upwardly along opposite sides of each cell in a plane substantially equally spaced from the cell ends. The current to each anode bus bar of each cell is therefore brought upwardly from the cathode connections located beneath the cell level at two points spaced from each other, that is at a point located between the cells and at a point located laterally from the center of each cell. The current in each riser is therefore only half the necessary total current required for each anode bus bar, whereby the magnetic fields at the beginning and the end of each cell are only half of the fields resulting from an arrangement in which connections between cathode and anode bus bars are provided only by risers located between the ends of adjacent cells.

The current leaving the end of the cathode bus bar of one cell is divided at the point $m$ and forms up to the point $o$ of the following cell two branches $m, n, o$ and $m, p, o$, which combine at the point $o$. According to the invention both of these branches are formed with the same cross section and have the same electrical resistance to assure the symmetrical division of the current supplied to the anode bus bar. It is advantageous to check the current load in the risers through suitable instruments.

The acting electromagnetic fields are shown by vectors in Fig. 2. It is pointed out that only the electromagnetic fields at the beginning and the end of each cell have any considerable effect on the liquid level in the cell, whereas the influence of the fields in the cell center is negligible.

The following table gives a summary of the magnetic field vectors at the beginning (A) and the end (E) of the cells according three different bus bar arrangements. Tabulations No. 1 and 2 give the summaries for typical arrangements according to the prior art in which the risers are arranged only between opposite ends of adjacent cells, whereas the last two lines of the table give the summary for the arrangement according to the present invention.

| No. | Location | Interior Field ($i$) | Riser Fields ($st$) | Anode bus bar fields ($a$) | Cathode bus bar fields ($k$) | Total field vector |
|---|---|---|---|---|---|---|
| 1 | A | +3 | +4 | +2 | −1,5 | +7,5 |
|   | E | −3 | −4 | +1 | −2 | −8 |
| 2 | A | +3 | +4 | +1 | −5 | +3 |
|   | E | −3 | −4 | −1 | −3 | −11 |
| 3 | A | +3 | +2 | +1 | −5 | +1 |
|   | E | −3 | −2 | +1 | −2 | −6 |

The vector size given in the table show only their order of magnitude. Their exact size will depend on the special cell constructions and especially on the arrangement of the iron parts in the cell.

The advantages of the bus bar arrangement according to the present invention will be obvious from the vector sizes given in the table. The riser field $st$ which has an especially detrimental effect is reduced to only half of the size in the arrangement according to the present invention.

It will be understood that each of the elements described above, or two or more together, may also find a useful application in other types of bus bar arrangements for electrolytic cells differing from the types described above.

While the invention has been illustrated and described as embodied in bus bar arrangement for electrolytic cells, it is not intended to be limited to the details shown, since various modifications and structural changes may be made without departing in any way from the spirit of the invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an electrolytic arrangement, in combination, a pair of electrolytic cell units arranged in end to end relationship in one direction with respect to each other and each having an anode means and a cathode means and being adapted to contain an electrolyte for forming a liquid cathode on said cathode means; a cathode bus bar portion electrically connected to the cathode means of one unit; a pair of riser bus bar portions electrically connected to said cathode bus bar portion, one of said riser portions being located between the ends of said units and the other of said riser portions being located intermediate the ends of the other of said units; and an anode bus bar portion electrically connected to said riser portions and the anode means of said other unit, said cathode bus bar portion and said anode bus bar portion extending horizontally and in said direction.

2. In an electrolytic arrangement, in combination, a pair of elongated electrolytic cell units arranged in end to end relationship with respect to each other and each having a lower cathode means and an upper anode means and being adapted to contain an electrolyte for forming a liquid cathode on said cathode means; a cathode bus bar portion electrically connected to and located beneath the cathode means of one of said units; an anode bus bar portion electrically connected to and located higher than the anode means of the other of said units; a first bus bar riser portion electrically connected to said cathode bus bar portion and said anode bus bar portion and located between the ends of said units; and a second bus bar riser portion electrically connected to said cathode bus bar portion and said anode bus bar portion and located intermediate the ends of said other unit, said cathode bus bar portion and said anode bus bar portion extending horizontally and longitudinally of the cell units, respectively.

3. In an electrolytic arrangement, in combination, a pair of elongated electrolytic cell units arranged in end to end relationship with respect to each other and each having a lower cathode means and an upper anode means and being adapted to contain an electrolyte for forming a liquid cathode on said cathode means; a cathode bus bar portion electrically connected to and located beneath the cathode means of one of said units; an anode bus bar portion electrically connected to and located higher than the anode means of the other of said units; a first bus bar riser portion electrically connected to said cathode bus bar portion and said anode bus bar portion and located between the ends of said units; and a second bus bar riser portion electrically connected to said cathode bus bar portion and said anode bus bar portion and located intermediate the ends of said other unit, said second bus bar riser portion being connected to said anode bus bar portion intermediate the ends thereof, said cathode bus bar portion and said anode bus bar portion extending horizontally and longitudinally of the cell units, respectively.

4. In an electrolytic arrangement, in combination, a pair of elongated electrolytic cell units arranged in end to end relationship with respect to each other and each having a lower cathode means and an upper anode means and being adapted to contain an electrolyte for forming a liquid cathode on said cathode mean; a cathode bus bar portion electrically connected to and located beneath the cathode means of one of said units; an anode bus bar portion electrically connected to and located higher than the anode means of the other of said units; a first bus bar riser portion electrically connected to said cathode bus bar portion and said anode bus bar portion and located between the ends of said units; and a second bus bar riser portion electrically connected to said cathode bus bar portion and said anode bus bar portion and located intermediate the ends of said other unit, said second bus bar riser portion being connected to said anode bus bar portion intermediate the ends thereof, and said first bus bar riser portion being connected to an end of said anode bus bar portion, said cathode bus bar portion and said anode bus bar portion extending horizontally and longitudinally of the cell units, respectively.

5. In an electrolytic arrangement, in combination, a series of elongated electrolytic cells arranged in end to end relationship with respect to each other and each having an anode means and a cathode means and being adapted to contain an electrolyte for forming a liquid cathode on said cathode means; an anode bus bar connected electrically to each of said anode means; a cathode bus bar connected electrically to each of said cathode means; and a pair of bus bar riser portions electrically interconnecting each cathode bus bar of one cell with the anode bus bar of the next cell, one of said riser portions being located between the ends of each pair of successive cells and the other of said riser portions being located intermediate the ends of each cell, said cells being adapted to contain a liquid electrolyte between said anode and said cathode.

6. In an electrolytic arrangement, in combination, a pair of elongated electrolytic cell units arranged in end to end relationship with respect to each other and each having an anode means and a cathode means and being adapted to contain an electrolyte for forming a liquid cathode on said cathode means; at least one cathode bus bar electrically connected to the cathode means of one unit, said cell units being adapted to contain a liquid electrolyte between said anode and said cathode; at least one anode means bus bar electrically connected to the anode of the other unit, said cathode and anode bus bars each having an end located between the ends of said pair of units; a first riser bus bar electrically connecting said ends of said cathode and anode bus bar; and a second riser bus bar leading from said end of said cathode bus bar to a point intermediate the ends of said anode bus bar and dividing said anode bus bar into a first portion located between said risers and a second portion, said first riser bus bar together with said first portion of said anode bus bar having the same electrical resistance of said second riser bus bar, said cathode and anode bus bars extending horizontally and longitudinally of said cell units, respectively.

7. In an electrolytic arrangement, in combination, a series of elongated electrolytic cells arranged in end to end relationship with respect to each other and each having an anode means and a cathode means and being adapted to contain an electrolyte for forming a liquid cathode on said cathode means; a pair of anode bus bars electrically connected in parallel to each of said anode means; a pair of cathode bus bars electrically connected in parallel to each of said cathode means; and two pairs of riser bus bar portions respectively electrically interconnecting the cathode bus bars of one cell with the anode bus bars of the following cell, one of said pairs of said riser portions being located between the ends of each pair of successive cells and the other of said pairs of said riser portions being located intermediate the ends of each cell, said cathode and anode bus bars extending horizontally and longitudinally of said cells, respectively.

8. In an electrolytic arrangement, in combination, a series of elongated electrolytic cells arranged in end to end relationship with respect to each other and each having a longitudinal plane of symmetry and each having an anode means and a cathode means and being adapted to contain an electrolyte for forming a liquid cathode on said cathode means; a pair of anode bus bars electrically connected in parallel to each of said anode means; a pair of cathode bus bars electrically connected in parallel to each of said cathode means; and two pairs of riser bus bar portions respectively electrically interconnecting the cathode bus bars of one cell with the anode bus bars of the following cell, one of said pairs of said riser portions being located between the ends of each pair of successive cells and the other of said pairs of said riser portions being located intermediate the ends of each cell, said anode bus bars, said cathode bus bars and said riser portions in each of said pair of riser portions being respectively arranged symmetrically to said plane of symmetry, said cathode and anode bus bars extending horizontally and longitudinally of said cells, respectively.

9. In an electrolytic arrangement, in combination, a series of elongated electrolytic cells arranged in end to end relationship with respect to each other and having each an anode means and a cathode means, said cells being adapted to contain a liquid electrolyte for forming a liquid cathode between said anode means and said cathode means; a pair of anode bus bars electrically connected in parallel to each of said anode means; a pair of cathode bus bars electrically connected in parallel to each of said cathode means; and two pairs of riser bus bar portions respectively electrically interconnecting the cathode bus bars of one cell with the anode bus bars of the following cell, one of said pairs of said riser portions being located between the ends of each pair of successive cells and the other of said pairs of said riser portion being located intermediate and equally spaced from the ends of each cell, said cathode and anode bus bars extending horizontally and longitudinally of said cells, respectively.

10. In an electrolytic arrangement, in combination, a series of elongated electrolytic cells arranged in end to end relationship with respect to each other and each having a longitudinal plane of symmetry and each having an anode means and a cathode means and being adapted to contain an electrolyte for forming a liquid cathode on said cathode means; a pair of anode bus bars electrically connected in parallel to each of said anode means; a pair of cathode bus bars electrically connected in parallel to each of said cathode means; and two pairs of riser bus bar portions respectively electrically interconnecting the cathode bus bars of one cell with the anode bus bars of the following cell, one of said pairs of said riser portions being located between the ends of each pair of successive cells and the other of said pairs of said riser portions being located intermediate and equally spaced from the ends of each cell, said anode bus bars, said cathode bus bars and said riser portions in each of said pair of riser portions being respectively arranged symmetrically to said plane of symmetry, said cathode and anode bus bars extending horizontally and longitudinally of said cells, respectively.

11. In an electrolytic arrangement, in combination, a series of elongated electrolytic cells arranged in end to end relationship with respect to each other and each having an anode means and a cathode means and being adapted to contain an electrolyte for forming a liquid cathode on said cathode means; a pair of anode bus bars electrically connected in parallel to each of said anode means; a pair of cathode bus bars electrically connected in parallel to each of said cathode means; and two pairs of riser bus bar portions respectively electrically interconnecting the cathode bus bars of one cell with the anode bus bars of the following cell, one of said pairs of said riser portions being located between the ends of each pair of successive cells and the other of said pairs of said riser portions being located intermediate the ends of each cell, and each of said anode bus bars having a free end extending beyond the other of said pairs of said riser portions, said cathode and anode bus bars extending horizontally and longitudinally of said cells, respectively.

12. In an electrical arrangement, in combination, a series of elongated electrolytic cells arranged in end to end relationship with respect to each other and each having an anode means and a cathode means and being adapted to contain an electrolyte for forming a liquid cathode on said cathode means; a pair of anode bus bars electrically connected in parallel to each of said anode means; a pair of cathode bus bars electrically connected in parallel to each of said cathode means, said cathode and anode bus bars each having an end located between successive cells; a pair of first riser bus bars respectively electrically connecting said ends of the cathode bus bars of one cell with said ends of the anode bus bars of the following cell; and a pair of second riser bus bars respectively leading from said ends of said cathode bus bars to a point located equally spaced from the ends of the anode bus bars of the following cell and dividing said anode bus bars respectively into first portions located between said risers and second portions, each of said pair of first riser bus bars together with said first portion of said anode bus bars connected thereto having the same electrical resistance as each of said pair of second riser bus bars, said cathode and anode bus bars extending horizontally and longitudinally of said cells, respectively.

13. In a circuit arrangement for a plurality of in series connected electrolytic cells arranged in end to end relationship in one direction with respect to each other having each an anode means and a cathode means and being adapted to contain an electrolyte for forming a liquid cathode on said cathode means, and having each an anode bus bar and a cathode bus bar respectively connected to the anode means and to the cathode means of the cell and respectively extending horizontally and in said direction, in combination, a pair of riser means connected to the anode bus bar of each cell for carrying each half of the total amount of current conveyed to said cell; and a third riser means connected to said cathode bus bar, one of said riser means of said pair of riser means rising along the center region of said cell and the other two of said riser means respectively rising at opposite ends of said cell.

14. In a circuit arrangement for a plurality of elongated in series connected electrolytic cells arranged in end to end relationship with respect to each other and having each an anode means and a cathode means and being addapted to contain an electrolyte for forming a liquid cathode on said cathode means, and having each an anode bus bar and a cathode bus bar respectively connected to the anode means and the cathode means of the cell and respectively extending horizontally and longitudinally of the cell, in combination, a pair of riser means connected to the anode bus bar of each cell for carrying each half of the total amount of current conveyed to said cell, one of said riser means of said pair of riser means rising at one end of said cell and being connected to one end of said anode bus bar and the other of said riser means of said pair of riser means rising along the center region of said cell and being connected to the center of said anode bus bar; and a third riser means connected to the end of the cathode bus bar adjacent to the other end of the cell and rising along said other end of said cell.

15. In a circuit arrangement for a plurality of elongated in series connected electrolytic cells arranged in end to end relationship with respect to each other and having each an anode means and a cathode means and being adapted to contain an electrolyte for forming a liquid cathode on said cathode means, and having each an anode bus bar and a cathode bus bar respectively connected to the anode means and the cathode means of the cell and respectively extending horizontally and longitudinally of the cell, in combination, a pair of riser means connected to the anode bus bar of each cell for carrying each half of the total amount of current conveyed to said cell, said pair of riser means being connected to each other at one end thereof and one of said riser means of said pair of riser means rising at one end of said cell and being connected at the other end thereof to one end of said anode bus bar and the other of said riser means of said pair of riser means rising along the center region of said cell and being connected at the other end thereof to the center of said anode bus bar, and the resistance of the circuit portions from the connected ends of said riser means through the one riser means to the center of said bus bar being equal to the resistance of the other riser means to the center of the bus bar; and a third riser means connected to the end of the cathode bus bar adjacent to the other end of the cell and rising along said other end of said cell.

References Cited in the file of this patent
FOREIGN PATENTS

| | | |
|---|---|---|
| 167,946 | Australia | Feb. 18, 1954 |
| 1,110,685 | France | Feb. 15, 1956 |